US008906163B2

(12) United States Patent  (10) Patent No.: US 8,906,163 B2
Huang et al.  (45) Date of Patent: Dec. 9, 2014

(54) METHODS AND APPARATUS FOR INTEGRATING AND CONTROLLING A PLASMA PROCESSING SYSTEM

(75) Inventors: Chung-Ho Huang, San Jose, CA (US); Cheng-Chieh Lin, Zhubei (TW)

(73) Assignee: Lam Research Corporation, Fremont, CA (US)

( * ) Notice: Subject to any disclaimer, the term of this patent is extended or adjusted under 35 U.S.C. 154(b) by 1037 days.

(21) Appl. No.: 12/962,486

(22) Filed: Dec. 7, 2010

(65) Prior Publication Data

US 2012/0138085 A1   Jun. 7, 2012

(51) Int. Cl.
*B08B 6/00* (2006.01)

(52) U.S. Cl.
CPC ........................................ *B08B 6/00* (2013.01)
USPC .............. 134/1.1; 134/1.3; 134/18; 134/25.4; 134/32

(58) Field of Classification Search
None
See application file for complete search history.

(56) References Cited

U.S. PATENT DOCUMENTS

| 2002/0199082 A1 | 12/2002 | Shanmugasundram et al. |
| 2003/0029383 A1 | 2/2003 | Ward et al. |
| 2003/0049376 A1 | 3/2003 | Schwarm et al. |
| 2005/0084988 A1 | 4/2005 | Huang et al. |
| 2005/0106863 A1 | 5/2005 | Chen et al. |
| 2007/0134821 A1 | 6/2007 | Thakur et al. |
| 2009/0037013 A1 | 2/2009 | Hendler et al. |
| 2010/0057237 A1 | 3/2010 | Kettaneh et al. |

OTHER PUBLICATIONS

"International Search Report", PCT Application No. PCT/IB11/55453, Mailing Date: Apr. 24, 2012.
"Written Opinion", PCT Application No. PCT/IB11/55453, Mailing Date: Apr. 24, 2012.

*Primary Examiner* — Eric Golightly (57) ABSTRACT

A method of operating one or more back end circuits of a plasma processing system, comprising: prior to a front end module receiving one or more wafers to be processed, receiving preliminary data at a back end circuit, wherein the preliminary data indicates a recipe and a predetermined number, the predetermined number indicating a number of wafers to be processed; determining whether a plasma processing chamber is ready for processing; and if the chamber is ready for processing and via the back end circuit, selecting a load lock, based on the predetermined number, instructing the front end module to pull the one or more wafers into the load lock, enabling the chamber to process a first wafer of the one or more wafers according to the recipe, and subsequent to the processing of the first wafer, instructing the front end module to remove the first wafer from the chamber.

20 Claims, 8 Drawing Sheets

METHODS AND APPARATUS FOR INTEGRATING AND CONTROLLING A PLASMA PROCESSING SYSTEM

BACKGROUND OF THE INVENTION

Plasma processing systems have long employed to process wafers into end electronic products. In a typical plasma system, there typically exists a front end, also known as an Equipment Front End Module (EFEM). The front end module typically represents the module designed to receive wafers from a storage location or a buffer location and to facilitate loading of the wafers into one or more load locks to be eventually loaded into one or more processing chambers.

Generally speaking, the load locks represent the interface between the outside atmospheric environment and the in-chamber processing environment in which parameters (e.g., pressure, gas flow, RF power, RF bias, etc.) are carefully controlled in accordance with the processing recipe.

Figure 1:
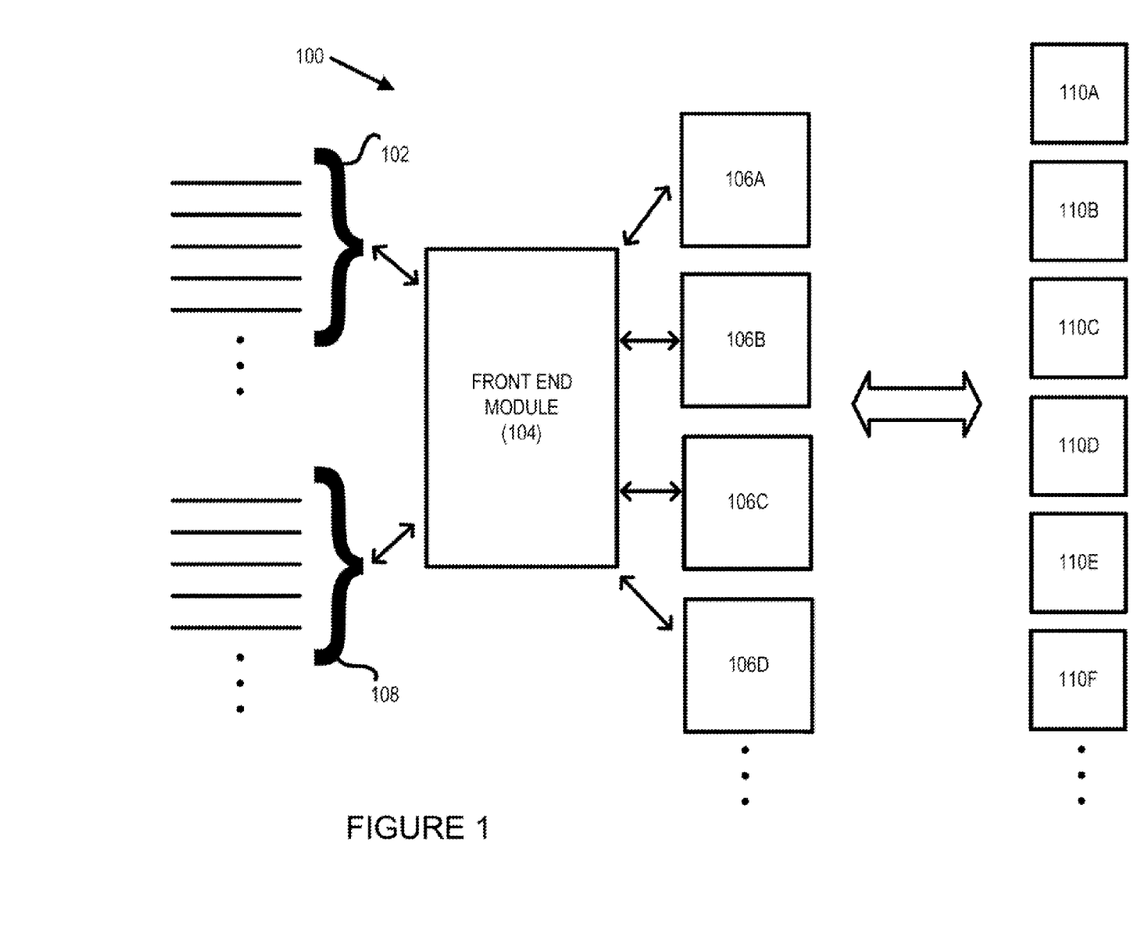
FIG. 1 illustrates an example plasma processing system to facilitate discussion.

With reference to FIG. 1, for example, there is shown an example plasma processing system 100, including a front end module 104, a plurality of load locks 106A-106D, and a plurality of processing modules 110A-110F. Front end module 104, representing the aforementioned EFEM in this example, may interface with one or more load locks for receiving wafers, which may be sent to front end module 104 in a batch or one wafer at a time from a storage or buffer location. Front end module 104 may include hardware and logic for interfacing between the human user and/or host computer and the load locks, for example. Front end module 104 may also include hardware and software for transferring wafers between storage/buffer locations and the load locks to facilitate processing by the process modules or chambers.

Wafers 102 represent production wafers (i.e., wafers to be processed into the desired end products) in the example of FIG. 1. There may also exist maintenance wafers 108, representing wafers employed for chamber maintenance/clean purposes. For example, specialized wafers may be used to season the chamber or to prepare the chamber or to clean the chamber. Maintenance wafers 108 may be stored in a dedicated location, and a maintenance wafer may be employed once or multiple times before the end of its lifetime.

Front end module 104 receives one or more of wafers 102 or 108 (typically but not necessarily a single wafer at a time for a capacitively coupled plasma processing system) and loads the wafer into one of load locks 106A-106D. From one of load locks 106A-106D, the wafer is then transported into one of processing chambers or processing modules (PM) 110A-100H for processing. The transportation of wafers into load locks 106A-106D and from one of load locks 106A-106D into one of PM's 110A-100H (as well as the unloading therefrom) may be accomplished using a suitable transport mechanism such as a robot arm, for example.

For various reasons, including economic and non-economic reasons, customers of semiconductor processing equipment manufacturers have attempted to acquire the front end module independently from the rest of the semiconductor processing system, such as independently from the back end that includes one or more processing modules or processing chambers. Customers may be motivated to save cost by buying a commodity front end and developing software applications to suit their own needs. Furthermore, customers may have a desire to develop and retain in-house expertise pertaining to front end operation. Still further, customers may have proprietary information pertaining to the recipes and/or the wafers, and they may wish to keep such proprietary information confidential even from the semiconductor equipment manufacturers (such as back end equipment manufacturers).

As such, there has been a push from customers to require semiconductor equipment manufacturers to provide the back end independently and to provide an appropriate interface for the back end to work with the customer's front end.

In one example approach, the customer desires to push wafer information, including wafer data, recipe data, and any configuration information from the front end to the back end to dictate when and how wafers are processed by the back end. In accordance with this methodology, front end module 104 of FIG. 1 acts as the master or the host client, and each of back end chambers 110A-110F acts as a slave or the host server. The host server (or slave) provides service in response to instructions from the front end (or master).

In accordance with this push methodology, the role of back end chambers 110A-110F is to receive wafers, wafer data, recipe data, and configuration data from front end module 104, to load the wafers into the chambers when the wafers are pushed to the back end by the front end, and to execute the recipe to process the wafers. While this methodology is capable of achieving the customer's desired goal of modularizing the front end from the back end and of permitting the customer to acquire and customize a commodity front end to their own specifications, there are disadvantages.

For example, a tremendous amount of intelligence and data capabilities have been built into the back end over the last few years to enable the tool to achieve just-in-time loading of specific wafers into specific load locks and/or specific chambers, to perform various chamber readiness tasks, to schedule system auto-clean/auto-maintenance (with or without the use of a maintenance wafer), and to actually perform such auto-clean/auto-maintenance tasks when needed. These and other capabilities allow the overall tool to operate more reliably and efficiently, and to improve yield and output while minimizing the cost of ownership.

To further elaborate on one aspect of the back end intelligence and data capabilities, some back end may be endowed with logic and data gathering capabilities to enable the back end to analyze data obtained from intelligent sensors, consumable parts states, auto-clean/auto-maintenance schedule, and/or other historical and/or statistical analysis, and/or the like, to implement the just-in-time transportation of wafers to/from the load locks and to/from the chambers. Proper just-in-time delivery ensures that wafers from the front end are not untimely delivered to the load locks or chambers.

For example, untimely delivery of wafers to the load locks represents inefficient utilization of load lock resource if a delivered wafer must sit in a load lock to wait for chamber availability. If the chamber is not ready to receive a particular wafer because it still needs time to prepare itself (such as performing temperature or pressure stabilization or to perform auto-maintenance/auto-clean), for example, the fact that the wafer is already loaded into a load lock means that such load lock is now inefficiently used and must remain idle until the wafer can be unloaded from that load lock into the chamber.

This is a particularly acute problem in a multi-job environment where there are fewer load locks than there are process modules and load lock availability is at a premium. The problem is made even more acute when certain load locks are usable only for certain wafers and/or certain processing modules. This is because in some cases, for example, a load lock employed for loading and unloading production etch wafers may be deemed to have been contaminated with etch byproducts, thereby rendering such a load lock incompatible for loading/unloading a maintenance wafer. As another example, a load lock employed for loading and unloading production etch wafers may need to be at a specific temperature. As such, other load locks not stabilized at the required temperature may not be used to load/unload these specific production etch wafers.

One possible solution is for back end equipment manufacturers to share data with front end developers to enable the front end developers to more efficiently integrate the front end with the back end. In many cases, however, it is not possible or desirable for a back end equipment manufacturer to share the back end intelligence and data capabilities with front end developers due to intellectual property concerns, misuse concerns, and integration complexity concerns. For example, back end manufacturers may be reluctant to share the know-how required to evaluate the chamber readiness condition, to evaluate the chamber's need for auto-clean and/or auto-maintenance, and/or to implement other back end capabilities since such intelligence and data capabilities tend to be highly proprietary and may represent a significant competitive advantage to be protected from public disclosure.

Even if back end equipment manufacturers wish to share this back end intelligence and data capabilities with front end developers, the integration of such back end intelligence and data into the front end (e.g., for scheduling purposes) would render the customization of the front end extremely complex and may require front end developers to acquire a level of expertise typically not possessed by scientists and engineers who are not familiar with the development of back end technologies. Such an approach would render the integration task unduly time consuming and expensive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention enable customers to more efficiently achieve their in-house customization and/or modularity goals for the front end than achievable with the aforementioned push methodology alone. In one or more embodiments, a pull methodology is implemented whereby the front end acts as a slave (host server) responsive to wafer loading requests from the back end, which acts as the master (host client).

In this pull methodology, the intelligence and data capabilities of the back end are leveraged by the back end in the timing and issuance of specific wafer loading requests pertaining to specific wafers and/or specific load locks and/or specific chambers to the front end. Wafer loading requests may be specific with respect to wafer loading timing, the specific load lock(s) and/or specific chamber(s), as well as the specific type of wafer to be loaded (e.g., a production wafer versus a non-production wafer), for example. In this pull methodology, load lock utilization and overall tool productivity are optimized without necessitating the divulging of the back end intelligence and data capabilities to the front end developers.

In one or more embodiments, a purely pull methodology is implemented in which the back end or the vacuum transfer module (VTM) associated with the back end acts as the master (client host) to request and to schedule the loading of specific production and/or non-production wafers into one or more specific load locks. Furthermore, the back end or the vacuum transfer module (VTM) associated with the back end acts as the master (client host) to request and to schedule the loading of specific production and/or non-production wafers from one or more specific load locks into one or more specific chambers.

Alternatively, in one or more embodiments, a hybrid pull methodology is implemented whereby the front end is permitted to retain push control over production wafers. However, the back end can interrupt the pushing of production wafers into the load locks and/or into the processing modules (chambers) if a predicted or an actual need for maintenance/clean occurs. In this case, the back end switches from acting in a slave (host server) mode to acting in a master (host client) mode.

After switching to a master (host client) mode in this hybrid methodology, the back end may schedule and/or issue a request to pull a non-production wafer (such as a maintenance wafer) into one or more specific load locks. In the master (host client) mode, the back end may also schedule and/or issue a request to pull the non-production wafer from one or more specific load locks into one or more specific chambers for auto-maintenance/auto-clean purposes. Once auto-maintenance/auto-clean is complete and the maintenance wafer is unloaded to its storage or buffer location, the back end returns master control to the front end so that the front end can resume master control to push production wafers into the load locks and/or to push the production wafers from the load locks into the chambers.

The features and advantages of embodiments of the invention may be better understood with reference to the figures and discussions that follow.

Figure 2A:
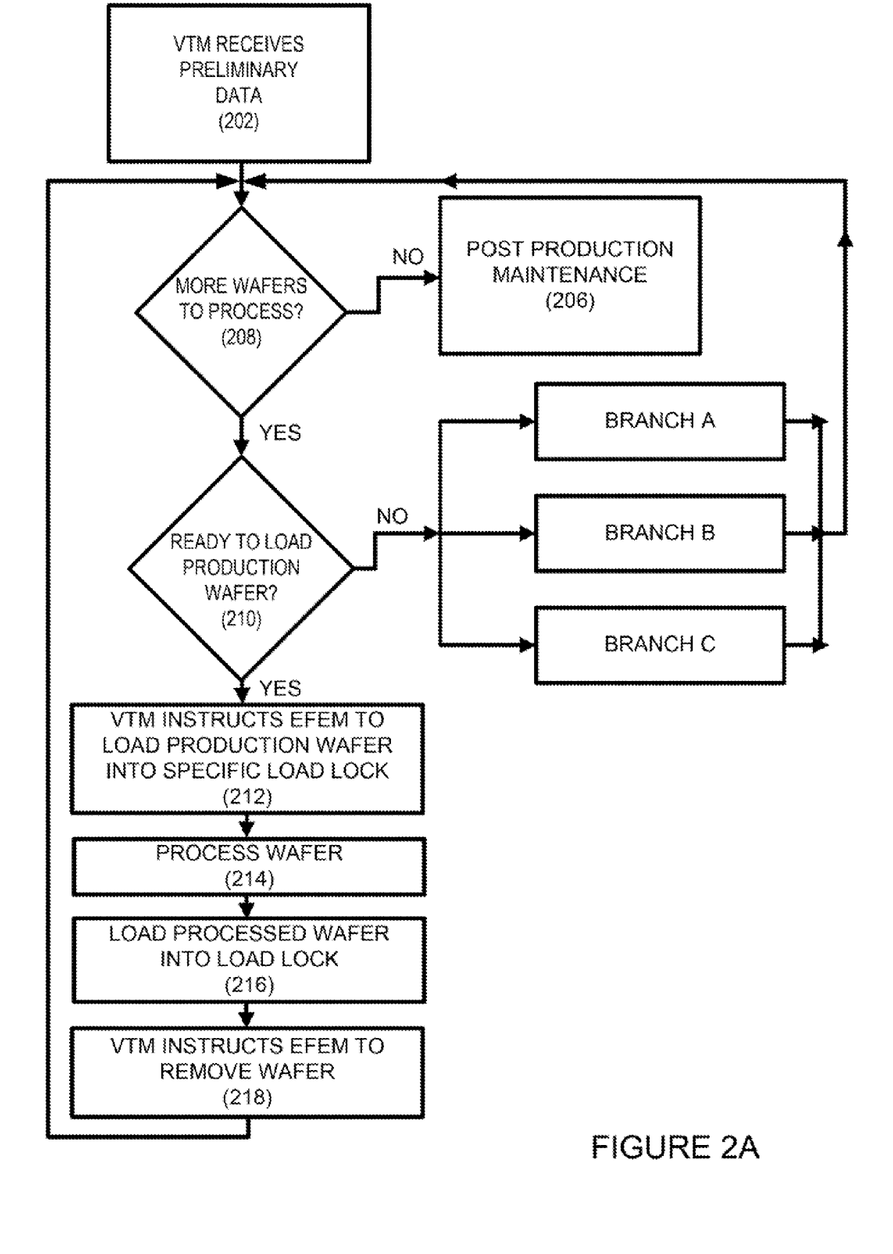
FIG. 2A shows, in accordance with an embodiment of the invention, an example flowchart for implementing the purely pull methodology.

FIG. 2A shows, in accordance with an embodiment of the invention, an example flowchart for implementing the purely pull methodology whereby the VTM acts as the host client (i.e., master) and schedules/issues pull requests for wafers (either production or non-production wafers) to the front end.

In step 202, the VTM receives preliminary data regarding the potential number of wafers to be processed from the tool host or from the user. In this case, the tool host may represent the software for controlling the overall tool, and the user may represent a human user. Notice that in contrast with the prior art, this information may be received, in some embodiments, by the VTM or the back end directly from the tool host or the user even before the wafers arrive at the front end. However, in other embodiments, the number of potential wafers to be processed may be received from the front end if such an implementation is desired.

The number of wafers to be processed is only "potential" at this point because, as will be discussed later herein, either the tool host or the user can amend (add or reduce) the number of wafers to be processed at any time in a production environment. Further, the recipe information, the tuning information, as well as any configuration data, may also be received directly from the tool host or user or from the front end in step 202.

In step 208, a check is performed to see whether a request for processing a wafer is still outstanding. This reality check is performed since the number of wafer may be amended (add or reduced) at any time by the tool host or the user if desired.

If there are no additional wafers to be processed, the method proceeds to step 206 to perform post production processing. Post production processing may involve performing certain steps following the conclusion of processing a production wafer or a batch of production wafers such as pumping down the chamber, certain cleaning steps, and the like.

On the other hand, if there are additional wafers to be processed (according to the outstanding requests), the method proceeds to step 210 to determine whether the chamber is ready for a production wafer to be pulled into a load lock.

If the chamber is ready for a production wafer to be pulled into a load lock, the method proceeds to step 212 whereby the VTM acting as the master or host client instructs the EFEM to load one or more production wafers into a specific load lock. To elaborate, a chamber may not be ready for a production wafer to be pulled into a load lock if for example, there is a need for chamber auto-maintenance/auto-clean or if the chamber state indicates that the chamber is not ready (e.g., temperature has not been satisfactorily stabilized) to receive a production wafer.

Generally speaking, intelligence in the back end enables the VTM to determine when and which load lock is suitable for loading/unloading a specific production wafer, in one or more embodiments. This is because the back end knows which load lock is available, which chamber is ready or not ready or about to be ready, and also knows which load lock can or cannot be employed for loading and unloading production wafers due to, for example, the need to avoid cross-contaminating a load lock with different, incompatible wafers.

In step 214, the wafer in the chamber is processed according to the recipe, the tuning information, and other configuration data received in step 202. In step 216 the processed wafer is unloaded into the load lock after processing. Again, intelligence in the back end enables the VTM to determine which load lock is suitable for loading/unloading a production wafer as well as when is the optimal time for loading/unloading the production wafer, one or more embodiments.

The method then proceeds to step 218 whereby the VTM acting as the master or host client instructs the EFEM to remove or swap wafers at a specific load lock. Thereafter, the method returns to step 208 to determine whether there are still wafers to be processed in the service request. The method returns to step 208 for this reality check since, as discussed, the requests may have been amended in the meantime to add or reduce the number of wafers to be processed.

Returning to step 210, if the chamber is not ready, the method proceeds to one of branches A, B and C to determine why the chamber is not ready. With respect to branch A, it is possible that the chamber is not ready because, for example, a need for automatic maintenance/auto-clean had arisen. With respect to branch B, it is possible that the chamber is not ready because, for example, chamber readiness state data indicates that the chamber is still going through the set up for the upcoming processing step. In branch C, it is possible that the chamber is not ready because, for example, just-in-time considerations indicate that no chambers may be optimally ready to accept a wafer.

Figure 2B:
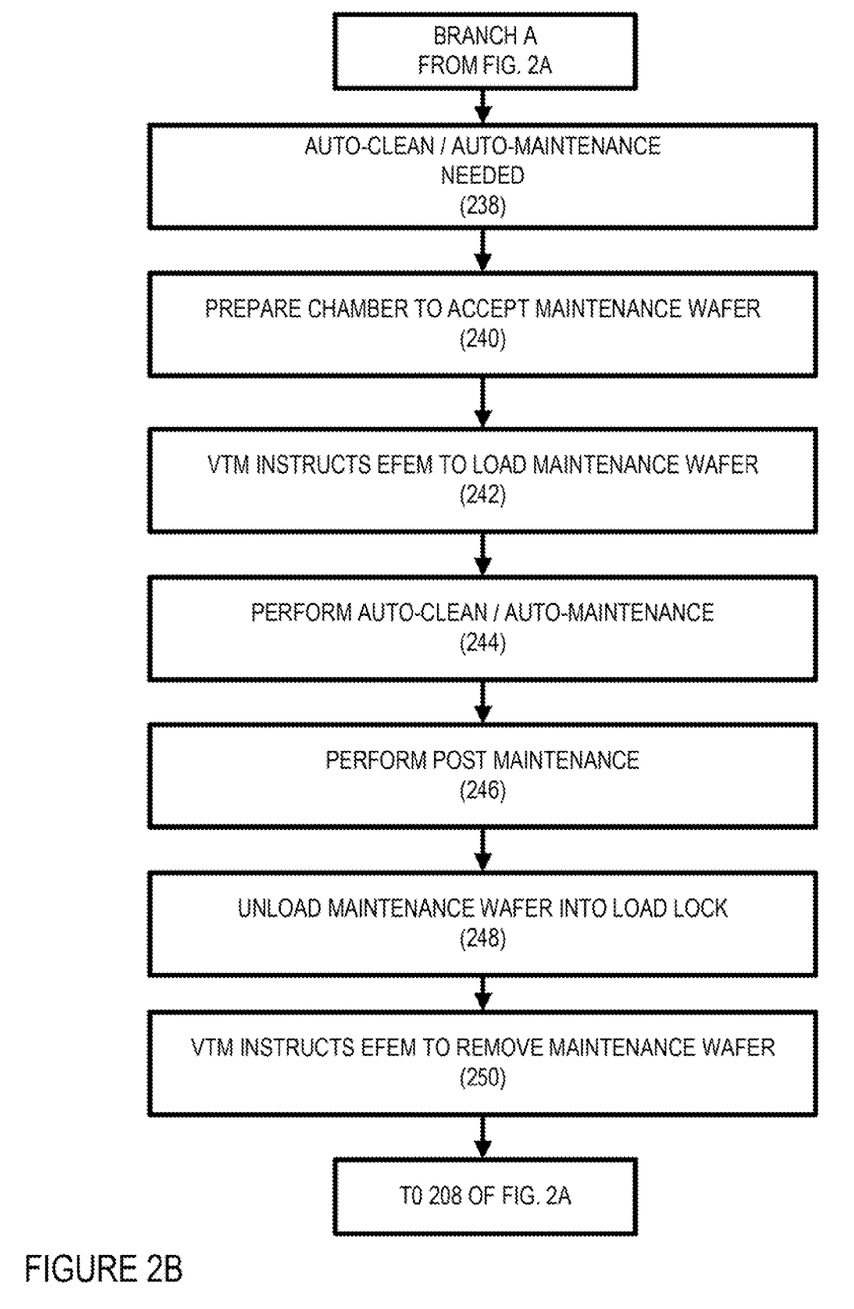
FIG. 2B illustrates, in accordance with an embodiment of the invention, branch A of FIG. 2A.

To elaborate, with reference to branch A (FIG. 2A), in step 238, an auto-clean/auto-maintenance service need may have arisen, as determined by the back end intelligence. The determination pertaining to whether auto-clean/auto-maintenance service is needed may employ a combination of intelligence sensors, statistical processing, consumable parts states, processing/clean/maintenance schedule, and the like.

In step 240 the chamber is prepared to accept a maintenance wafer if a maintenance wafer is needed for the auto-clean/auto-maintenance task. This preparation may include, for example, changing and stabilizing the temperature of the chamber. In step 242, the VIM instructs the EFEM to load a specific type of maintenance wafer into a specific load lock. Step 242 occurs once the VTM determines that the chamber to be maintained/cleaned is ready to receive the specific of maintenance wafer. Again, intelligence is applied to ensure that the correct maintenance wafer is loaded into the correct load lock at the optimal time to avoid cross contamination and to optimize usage of the load lock (e.g., to avoid forcing the load lock with a maintenance wafer inside to wait for the chamber to be ready to accept the maintenance wafer).

In step 244, the auto-maintenance/auto-clean is performed according to the requisite auto-clean/auto-maintenance recipe. In step 246, post maintenance/clean service is performed if required. The post-maintenance/clean service may include pumping out the chamber, restabilizing the temperature, coating the chamber, and the like.

In step 248, the processed maintenance wafer is unloaded into a specific load lock to remove it from the chamber. In step 250, the VTM instructs the front end to remove the maintenance wafer from the load lock to an appropriate storage or buffer location. Thereafter, the process return to step 208 to determine whether there are additional wafers to be processed.

Figure 2C:
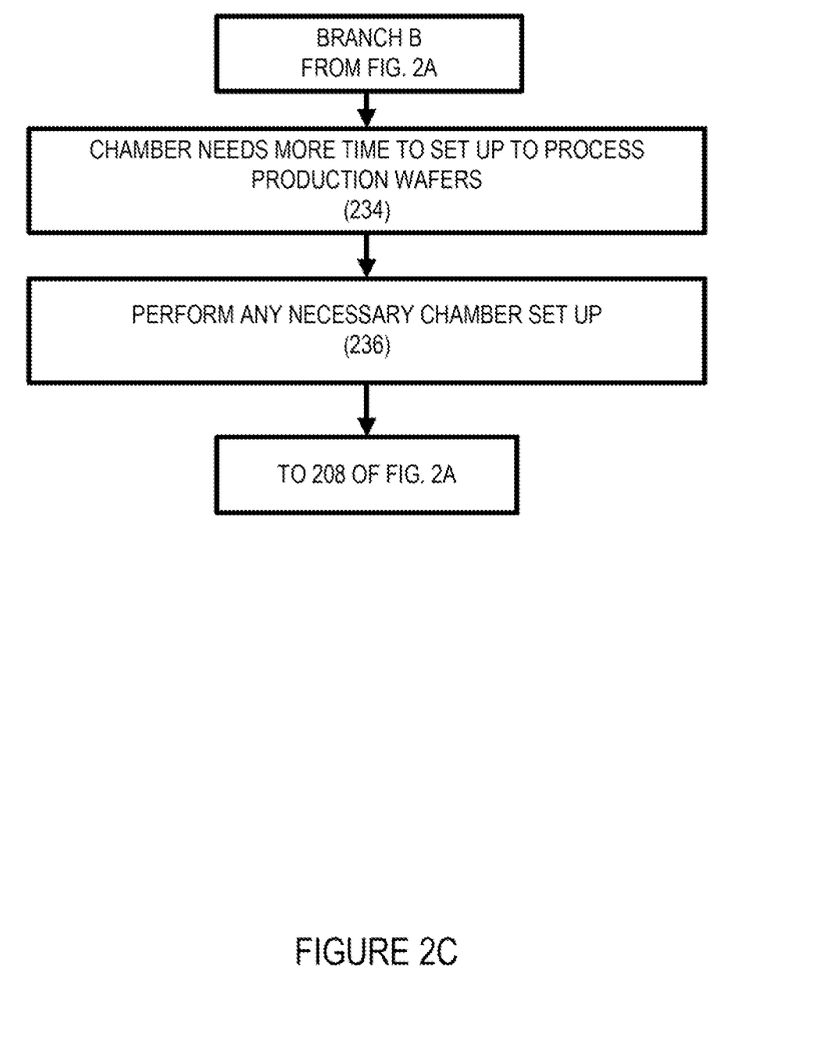
FIG. 2C illustrates, in accordance with an embodiment of the invention, branch B of FIG. 2A.

With respect to branch B (FIG. 2C), if a chamber needs some time to prepare itself before it can be ready to accept a production wafer (step 234), the method proceed to step 236 to perform any necessary set up to get the chamber ready to accept production wafer. Depending on the specific recipes employed, different chambers in the tool cluster may require different preparatory steps as well as different processing durations, for example. One of the goals of branch B may be to minimize load lock loiter time, i.e., the time during which a wafer is disposed in a load lock but there are no suitable chambers ready to receive that specific wafer. A lengthy loiter time represents an inefficient usage of load lock resources since that load lock cannot be used for other purposes (e.g., for loading another wafer into another chamber which may be ready to accept that other wafer).

Figure 2D:
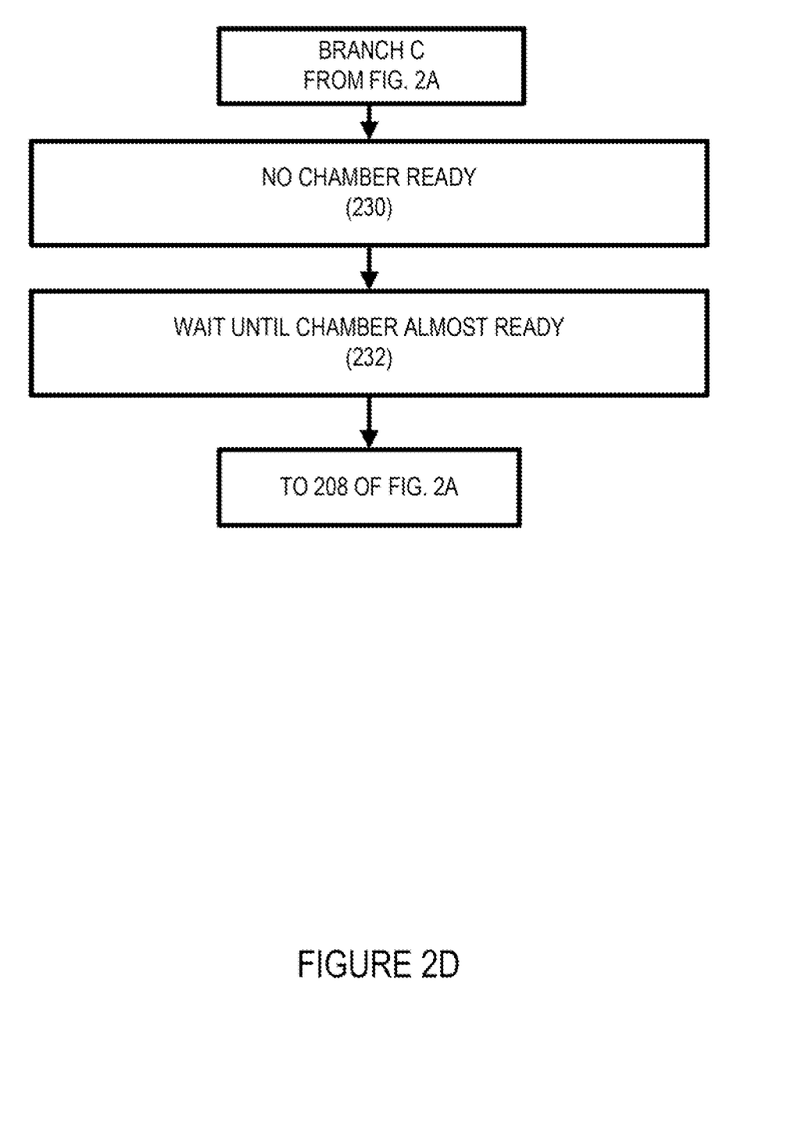
FIG. 2D illustrates, in accordance with an embodiment of the invention, branch C of FIG. 2A.

With respect to branch C (FIG. 2D), it is possible that no chamber is ready at any time soon to accept the next production wafer. For example, this situation may occur when all chambers are busy and there are no chambers available or when one or more chambers have been down for maintenance and there are no chambers available to receive this specific production wafer. In this case, the method proceeds to step 232 to wait until a PM is ready or almost ready (just-in-time). The "almost-ready" prediction in step 232 may be performed by the intelligence that exists in the back end to enable the back end to request and pull in a production wafer into a load lock slightly ahead of time so that when the chamber is actually ready, the wafer is ready to be loaded from the load lock into that chamber. Just-in-time refers to the philosophy of optimally and timely scheduling usage of resources (including one or more of buffer location resources, load lock resources, chamber resources, wafer resources, etc.) in a manner that minimizes inefficiency and maximizes throughput. Thereafter, the method returns to step 208 to again ascertain whether there are additional wafers to be processed.

Figure 3A:
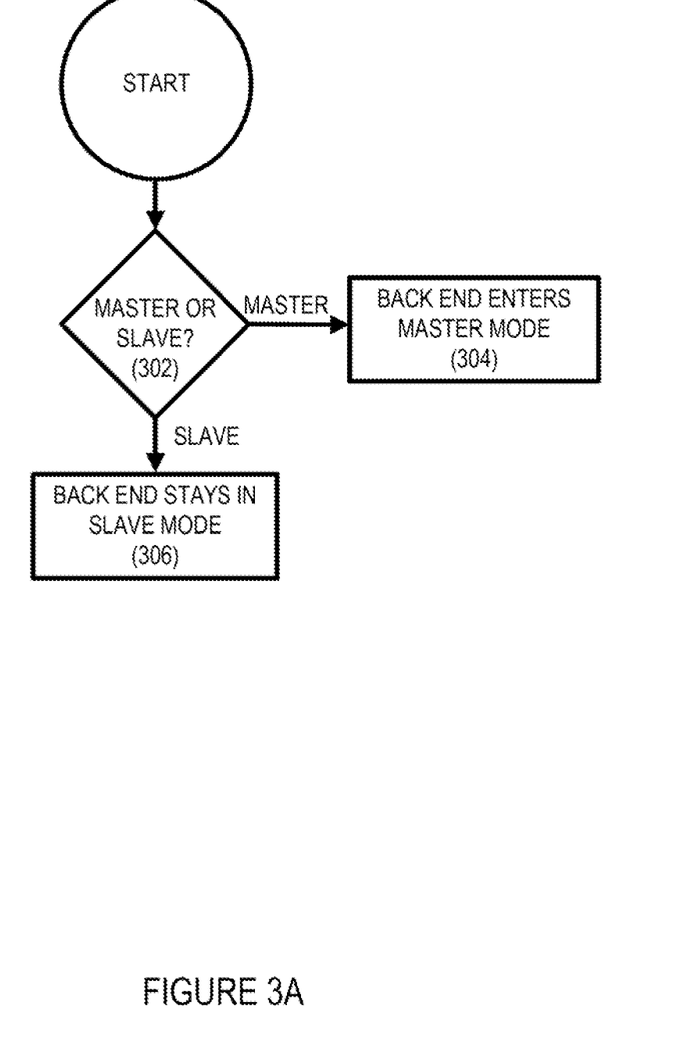
FIG. 3A illustrates, in accordance with an embodiment of the invention, back end code running in the background to ascertain whether the master or the slave mode should be executed by the back end.
Figure 3B:
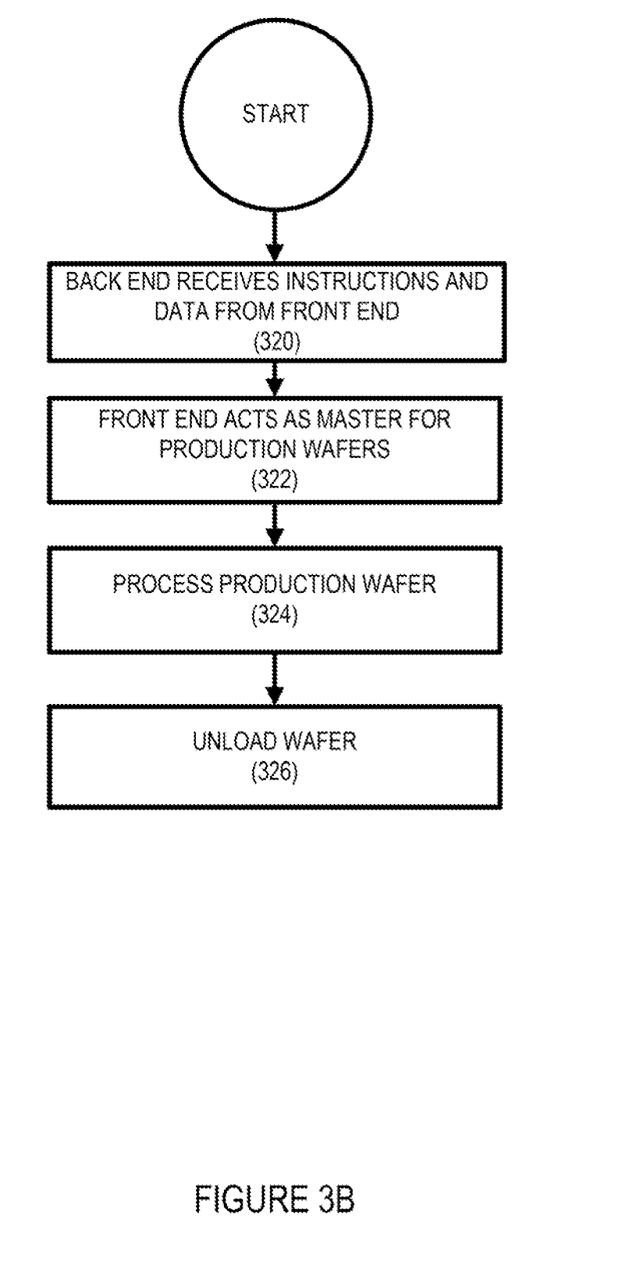
FIG. 3B shows, in accordance with an embodiment of the invention, the steps involved when the back end acts in the slave mode.
Figure 3C:
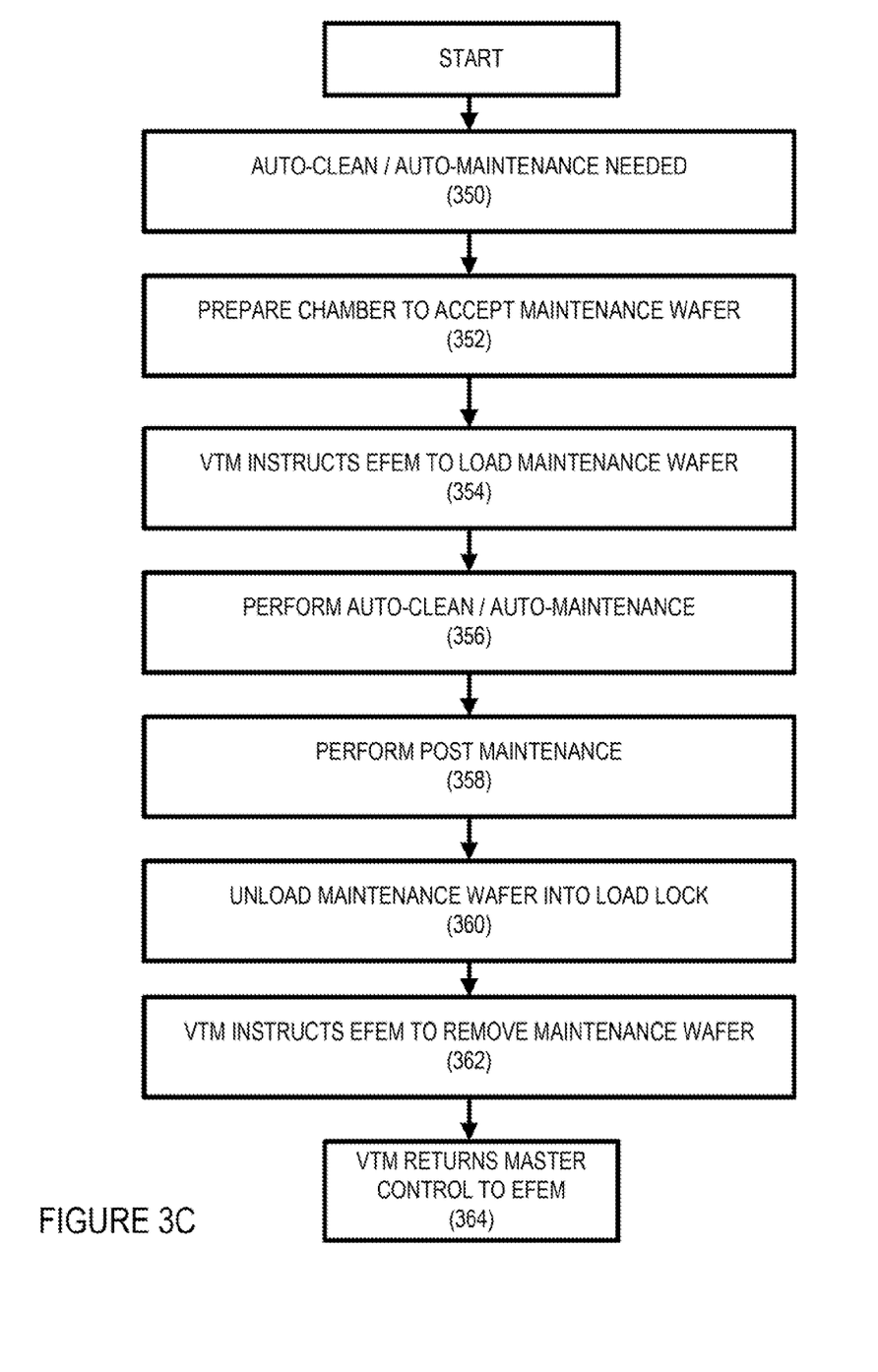
FIG. 3C illustrates, in accordance with an embodiment of the invention, the steps involved when the back end assumes master control to perform any necessary auto-maintenance/auto-clean.

FIGS. 3A-3C implement the hybrid methodology whereby the front-end (e.g., the customer) is able to maintain master control of the transportation of production wafers and can push production wafers from the front end to the load locks and from the load locks to the processing modules in the master mode. However, the hybrid methodology of FIGS. 3A-3C permits the back end to employ its own proprietary intelligence and data capabilities to determine if and when maintenance/clean is required.

In one or more embodiments, if and when auto-maintenance/auto-clean is required, the system may enter a hybrid state whereby the back end assumes master control and the front end becomes a slave in order for the back end master to dictate to the front end when and how to pull one or more specific non-production wafers into a specific load lock to perform auto-maintenance on a specific chamber. In one or more embodiments, even if a non-production Wafer is not required for the auto-maintenance/auto-clean, the back end may also assume master control during the auto-maintenance/auto-clean cycle(s).

With reference to FIG. 3A, back end code running in the background ascertains whether the master or the slave mode should be executed by the back end, in one or more embodiments. This determination in step 302 may be based on the auto-maintenance/auto-clean criteria, schedules, sensor states, statistical analysis, and/or the like, which are implemented by the back end intelligence.

If auto-maintenance/auto-clean is deemed to be required in step 302, for example, the system enters, as discussed earlier, the hybrid state whereby the back end becomes the master (304) to issue a pull request to the front end for a specific non-production wafer and/or to execute auto-maintenance/auto-clean tasks. On the other hand, if auto-maintenance/auto-clean is deemed to be not required, the system stays in the traditional mode (step 306) whereby the front end acts as the master (host client) to push production wafers to the back end through the load locks.

FIG. 3B shows, in accordance with an embodiment of the invention, the steps involved when the back end acts in the slave mode. In this slave mode, the front end acts as the master for pushing production wafers to the load locks and/or the back end. In step 320, the VTM receives preliminary data regarding the potential number of wafers to be processed, the recipe information, the tuning information, as well as any configuration data from the front end or the tool host or the user. In step 322, the EFEM acting as the master or host client pushes one or more production wafers into a load lock and instructs the back end to load those wafers from the load lock into chambers for process.

In step 324, the wafer in the chamber is processed according to the recipe, the tuning information, and other configuration data received in step 320. In step 324 the processed wafer is unloaded into the load lock after processing. Thereafter, the wafer is unloaded from the load lock (326) and the back end is again ready for processing the next production wafer responsive to instructions from the front end or to enter into the master mode to perform auto-clean/auto-maintenance.

FIG. 3C illustrates, in accordance with an embodiment of the invention, the steps involved when the back end assumes master control to perform any necessary auto-maintenance/auto-clean (as determined by the process of FIG. 3A). To elaborate, in step 350, an auto-clean/auto-maintenance service need may have arisen, as determined by the back end intelligence. The determination pertaining to whether auto-clean/auto-maintenance service is needed may employ a combination of intelligence sensors, statistical processing, consumable parts states, processing/clean/maintenance schedule, and the like.

In step 352, the chamber is prepared to accept a maintenance wafer if a maintenance wafer is needed for the auto-clean/auto-maintenance task. This preparation may include, for example, changing and stabilizing the temperature of the chamber. In step 354, the VTM instructs the EFEM to load a specific type of maintenance wafer into a specific load lock. Step 354 occurs once the VTM determines that the chamber to be maintained/cleaned is ready to receive the specific of maintenance wafer. If desired, intelligence may be applied to ensure that the correct maintenance wafer is loaded into the correct load lock at the optimal time to avoid cross contamination and to optimize usage of the load lock (e.g., to avoid forcing the load lock with a maintenance wafer inside to wait for the chamber to be ready to accept the maintenance wafer).

In step 356, the auto-maintenance/auto-clean is performed according to the requisite auto-clean/auto-maintenance recipe. In step 358, post maintenance/clean service is performed if required. The post-maintenance/clean service may include pumping out the chamber, restabilizing the temperature, coating the chamber, and the like.

In step 360, the processed maintenance wafer is unloaded into a specific load lock to remove it from the chamber. In step 362, the VTM instructs the front end to remove the maintenance wafer from the load lock to an appropriate storage or buffer location. Thereafter, the process returns master control to the front end (364) to allow the front end to push production wafers to the back end As can appreciate it from the foregoing, embodiments of the invention permit the customers of semiconductor manufacturing equipment manufacturers (e.g., the semiconductor device manufacturers) to purchase a commodity front end for their own customization needs and to integrate their front end with the back end in a manner that leverages the intelligence and data capabilities of the back end for optimal throughput. When integrated in accordance with embodiments of the invention, customers of semiconductor manufacturing equipment manufacturers (e.g., the semiconductor device manufacturers) may be able to take advantage of the intelligence and data capabilities of the back end in a manner that does not require the back end manufacturers to divulge to the front end developers details regarding how the back end data is collected and how the data is processed to implement the back end intelligence.

Likewise, the front end developers, when integrating the front end with the back end in accordance with embodiments of the invention, do not need to divulge to the back end equipment manufacturers details regarding recipes and wafers in order to take advantage of the intelligence and data capabilities of the back end. In this manner, the back end intelligence and data capabilities may be utilized for wafer production without compromising the intellectual property of either the front end developer or the back end equipment manufacturers. Another efficiency benefit is also realized since the front end developer does not need to acquire the expertise to analyze and understand back end data and intelligence. When the back end operates in the master (host client) mode, its complex intelligence and data capabilities are essentially modularized in the back end and are leveraged to formulate timely and specific wafer pull requests, which are simple and readily understood by front end developers. This simplification reduces integration time and cost while allowing each of the front end developers and back end equipment manufacturers to retain control over their own expert domain.

While this invention has been described in terms of several preferred embodiments, there are alterations, permutations, and equivalents, which fall within the scope of this invention. For example, while the operation has been described using flowchart steps, it should be understood that embodiments of the invention also covers logic (software or hardware, whether dedicated/hardware or programmable or instruction executing, whether a single chip or multiple chips and/or multiple discrete devices) implemented to execute the methodologies discussed herein. As another example, although the flowchart steps are shown in a sequential fashion, one skilled in the art would readily recognize that some of the steps may be performed in a different order while still achieving the same result and indeed programming methodologies other than sequential instructions may also be employed. Consequently, it should also be noted that there are many alternative ways of implementing the methods and apparatuses of the present invention. Although various examples are provided herein, it is intended that these examples be illustrative and not limiting with respect to the invention.

What is claimed is:

1. A method of operating one or more back end circuits of a plasma processing system, wherein the plasma processing system comprises a front end module, a plurality of load locks, and a first plasma processing chamber, the method comprising:
   prior to the front end module receiving one or more wafers to be processed, receiving preliminary data at the one or more back end circuits, wherein the preliminary data indicates a recipe and a predetermined number, wherein the predetermined number indicates a number of wafers to be processed;
   determining whether the first plasma processing chamber is ready for processing; and
   if the first plasma processing chamber is ready for processing and via the one or more back end circuits,
      selecting a first load lock of the plurality of load locks,
      based on the predetermined number, instructing the front end module to pull the one or more wafers into the first load lock,
      enabling the first plasma processing chamber to process a first wafer of the one or more wafers according to the recipe, and
      subsequent to the processing of the first wafer, instructing the front end module to remove the first wafer from the first plasma processing chamber.

2. The method of claim 1, further comprising:
   determining a time when to load the first wafer into the first load lock; and
   indicating, via the one or more back end circuits, the time to the front end module.

3. The method of claim 1, further comprising determining a time when to unload the first wafer from the first plasma processing chamber,
   wherein the first wafer is unloaded from the first plasma processing chamber at the determined time.

4. The method of claim 1, wherein the preliminary data is received from the front end module at the one or more back end circuits.

5. The method of claim 1, wherein:
   the preliminary data further comprises tuning data and configuration data; and
   the processing of the first wafer is performed according to the tuning data and the configuration data.

6. The method of claim 1, further comprising, subsequent to receiving the preliminary data and prior to determining whether the first plasma processing chamber is ready for processing:
   checking whether a request to process the one or more wafers is pending; and
   if the request to process the one or more wafers is not pending, performing post production processing or post production maintenance,
   wherein the determining of whether the first plasma processing chamber is ready for processing is performed if the request to process the one or more wafers is pending.

7. The method of claim 6, wherein the post production processing comprises pumping down the first plasma processing chamber.

8. The method of claim 6, wherein the post production maintenance comprises cleaning or performing maintenance on the first plasma processing chamber.

9. The method of claim 6, wherein the first plasma processing chamber is ready for processing if (i) the one or more of the back end circuits determines that cleaning or maintenance is to be performed on the first plasma processing chamber, and (ii) a temperature of the first plasma processing chamber is stabilized.

10. The method of claim 1, further comprising, via the one or more back end circuits and prior to determining whether the first plasma processing chamber is ready for processing, selecting the first plasma processing chamber from a plurality of plasma processing chambers.

11. The method of claim 1, further comprising:
   determining, via the one or more back end circuits, whether cleaning or maintenance is to be performed on the first plasma processing chamber; and
   if cleaning or maintenance is to be performed on the first plasma processing chamber and via the one or more back end circuits,
      preparing the first plasma processing chamber to receive a maintenance wafer,
      instructing the front end module to load the maintenance wafer into a second load lock,
      enabling cleaning or maintenance of the first plasma processing chamber, and
      instructing the front end module to remove the maintenance wafer from the first plasma processing chamber.

12. The method of claim 1, further comprising, via the one or more back end circuits, determining whether the first plasma processing chamber is performing a setup process for the processing of the first wafer,
   wherein the instructing of the front end module to pull the one or more wafers into the first load lock is performed if the first plasma processing chamber is performing the setup process and based on a duration of the setup process.

13. The method of claim 1, further comprising, via the one or more back end circuits:
   prior to instructing the front end module to pull the one or more wafers into the first load lock, determining whether one of a plurality of plasma processing chambers is ready for processing the first wafer, wherein the plasma processing system comprises the plurality of plasma processing chambers, and wherein the plurality of plasma processing chambers comprises the first plasma processing chamber;
   if none of the plurality of plasma processing chambers is ready for processing the first wafer, waiting until (i) one of the plurality of plasma processing chambers is ready to process the first wafer, or (ii) a predicted amount of time remains until the one of the plurality of plasma processing chambers is ready to process the first wafer; and
   instructing the front end module to pull the one or more wafers into the first load lock, if (i) the one of the plurality of plasma processing chambers is ready to process the first wafer, or (ii) the predicted amount of time remains until the one of the plurality of plasma processing chambers is ready to process the first wafer.

14. The method of claim 13, wherein the one of the plurality of plasma processing chambers is the first plasma processing chamber.

15. The method of claim 1, wherein the first wafer is for an end product or is a maintenance wafer processed during maintenance of the first plasma processing chamber.

16. The method of claim 1, wherein each of the front end module and the one or more back end circuits is configured to transition between operating in a master mode and operating in a slave mode.

17. The method of claim 16, further comprising:
   via the one or more back end circuits and while the one or more back end circuits are operating in the slave mode,
      determining whether cleaning or maintenance is to be performed in the first plasma processing chamber,
      if cleaning or maintenance is not to be performed in the first plasma processing chamber, continuing to operate in the slave mode, wherein the one or more wafers are for one or more end products, and wherein the front end module controls transfer of the one or more wafers to the first plasma processing chamber while the one or more back end circuits operate in the slave mode, and
      if cleaning or maintenance is to be performed in the first plasma processing chamber, transitioning to the master mode; and
   via the one or more back end circuits and while the one or more back end circuits are operating in the master mode,
      selecting the first load lock or a second load lock,
      instructing the front end module to load a maintenance wafer into the first load lock or the second load lock,
      enabling cleaning or maintenance of the first plasma processing chamber,
      instructing the front end module to remove the maintenance wafer from the first plasma processing chamber, and
      subsequent to removing the maintenance wafer from the first plasma processing chamber returning to operating in the slave mode.

18. The method of claim 17, wherein the front end module (i) operates in the master mode while the one or more back end circuits operate in the slave mode, and (ii) operates in the slave mode while the one or more back end circuits operate in the master mode.

19. The method of claim 17, further comprising, via the one or more back end circuits and while the one or more back end circuits are operating in the master mode:
   selecting the first plasma processing chamber from a plurality of plasma processing chambers; and
   preparing the first plasma processing chamber to receive the maintenance wafer, wherein the cleaning or maintenance of the first plasma processing chamber is enabled subsequent to the preparing of the first plasma processing chamber.

20. The method of claim 17, further comprising, subsequent to the cleaning or maintenance of the plasma processing chamber, performing post maintenance including pumping out the plasma processing chamber and stabilizing a temperature in the plasma processing chamber.

* * * * *